July 4, 1933.  E. H. OTT ET AL  1,916,435
MOLDED TABLE COVER
Filed May 14, 1930  3 Sheets-Sheet 1

INVENTORS.
Ernest H. Ott &
Benjamin J. Gudge.
BY
ATTORNEY

July 4, 1933.  E. H. OTT ET AL  1,916,435
MOLDED TABLE COVER
Filed May 14, 1930   3 Sheets-Sheet 2
Fig. 3.
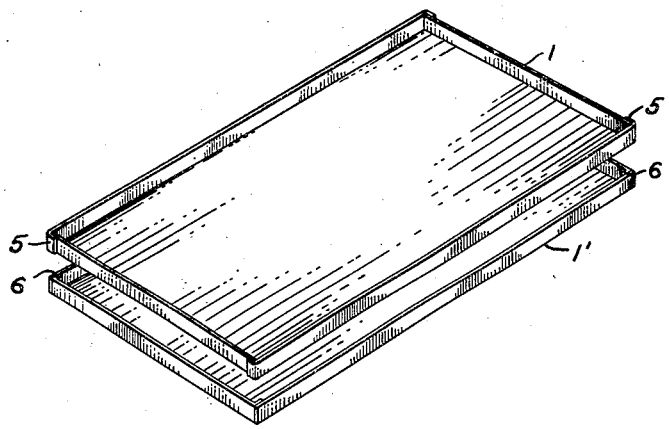
Fig. 4.
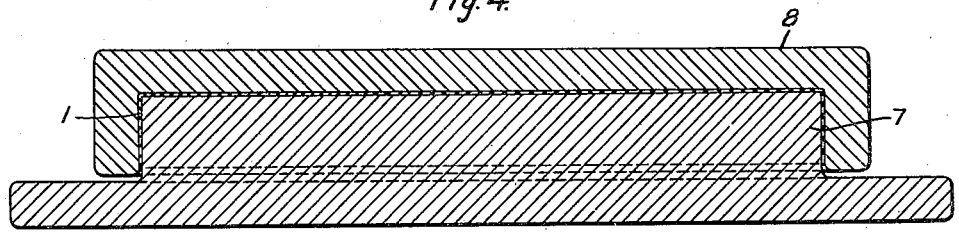
Fig. 6.   Fig. 5.   Fig. 7.
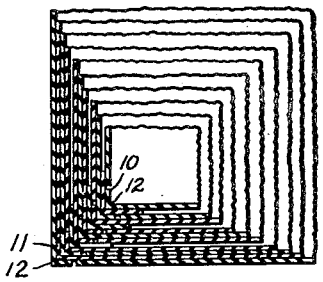 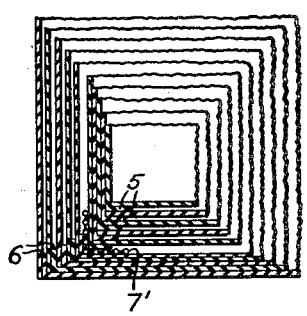 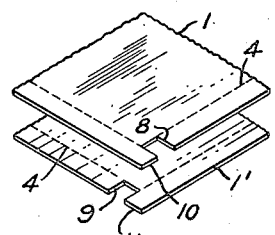
INVENTORS.
Ernest H. Ott &
Benjamin J. Gudge.
ATTORNEY

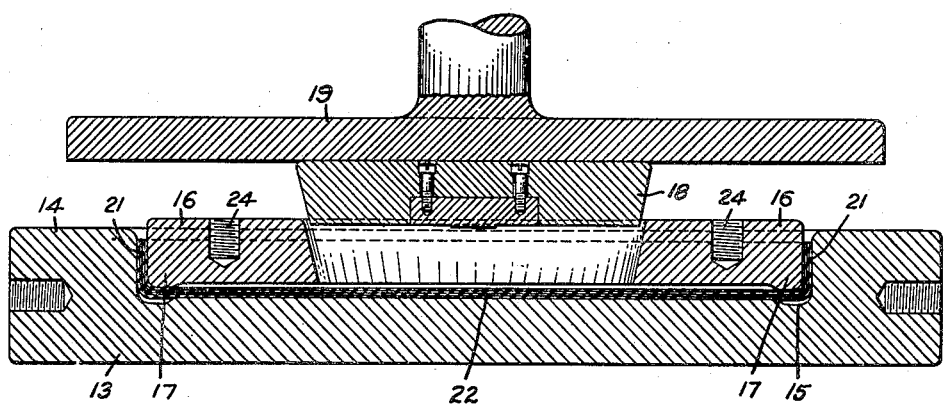
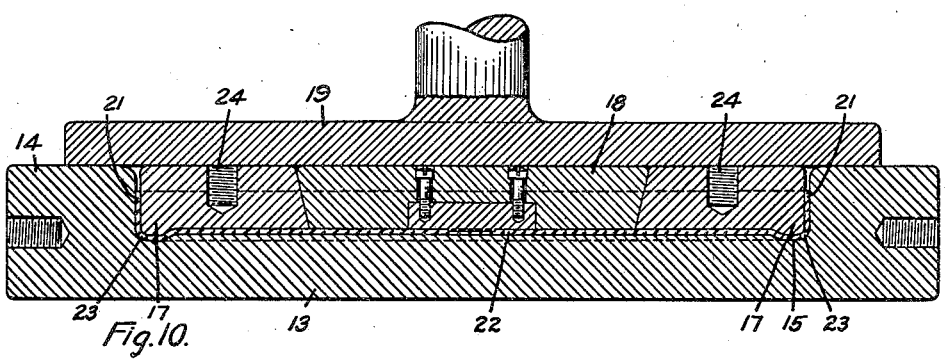
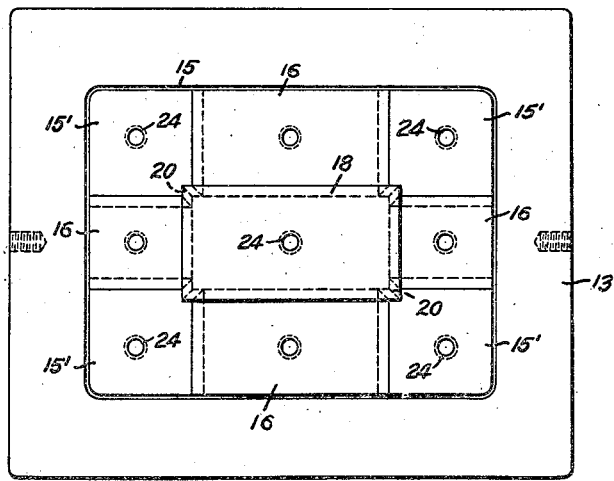
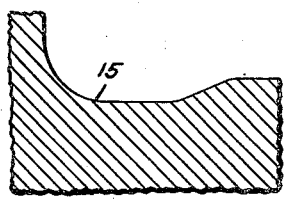
INVENTORS.
Ernest H. Ott &
Benjamin J. Gudge.
BY
ATTORNEY Patented July 4, 1933

1,916,435

UNITED STATES PATENT OFFICE

ERNEST H. OTT, OF PITTSBURGH, AND BENJAMIN J. GUDGE, OF EAST PITTSBURGH, PENNSYLVANIA, ASSIGNORS TO WESTINGHOUSE ELECTRIC AND MANUFACTURING COMPANY, A CORPORATION OF PENNSYLVANIA

MOLDED TABLE COVER

Application filed May 14, 1930. Serial No. 452,234.

Our invention relates to composite articles and more particularly to table tops or covers composed of laminated sheet material and to processes of producing the same.

An object of our invention is to provide an improved table top formed of laminated material that may be easily maintained in a sanitary condition and which is unaffected by heat, moisture, acids and most alkalis.

Another object of our invention is to provide an improved table cover formed of a composite, unitary structure which shall have side flanges, by means of which it may be readily clamped upon an ordinary table, and a rolled rim or apron for retaining objects placed upon its surface.

A still further object of our invention is to provide a process of forming table tops which comprises preforming layers of fibrous sheet material which have been impregnated with a binder, assembling the preformed structure in a mold having a matrix of a special contour, and molding the sheets together.

As is well known, it is customary, in hospitals, to provide tables near the beds on which medicine and various articles may be so placed that they may be readily accessible to the patient or which may be employed as a depository for various medicinal articles during the examination or treatment of the patient. Tables heretofore employed for such purposes have usually been constructed of metal and have not been entirely satisfactory because of a tendency to corrode and because they are readily attacked by acids and alkalis, or other liquids, which may be accidentally spilled upon their surfaces.

We have made the discovery that a suitable cover or top for such tables may be readily prepared by assembling a plurality of layers of fibrous sheet material, impregnated with a suitable binder, in a mold having a matrix of a special contour and applying pressure in such manner that an article will be formed that has a rolled upwardly-extending rim, at its margin, and downwardly extending flanges by means of which it may be readily clamped to a table such as is ordinarily employed in a hospital or in a kitchen.

Our invention will be better understood by referring to the accompanying drawings, in which.

Fig. 3 is a similar view showing flanges on two adjacent groups of sheets.

Fig. 4 is a cross sectional view of a mold and a tool for preforming the sheets.

Fig. 5 is a cross-sectional view, on an enlarged scale, taken through the corner of a preformed structure.

Fig. 6 is a view, similar to Fig. 5, showing a modification.

Fig. 7 is a fragmentary view, similar to Fig. 2, showing the sheets notched in a different manner.

Fig. 8 is a cross-sectional view showing a mold, and a plurality of sheets placed in the matrix of the mold before heat and pressure have been applied.

Fig. 9 is a similar view of the mold after heat and pressure have been applied and showing the improved table top as molded.

Fig. 10 is a plan view showing the mold utilized in practicing the invention.

Fig. 11 is an enlarged view showing the contour of the matrix of the mold in which the rolled margin of the table is formed.

Figure 1:
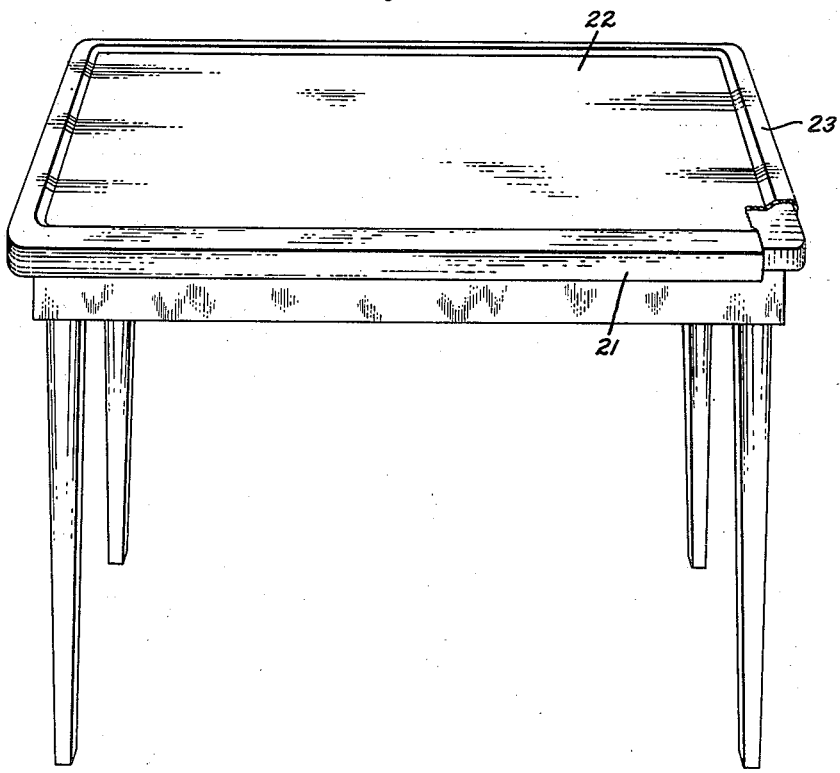
Figure 1 is a perspective view of a table provided with a cover formed of molded laminated material.

In practicing our invention, fibrous sheet material, which is preferably composed of paper, although layers of cloth or duck may be interspersed between the layers of paper, are impregnated with a suitable binder, such as a phenolic condensation product, and assembled in a predetermined manner. In order to provide a suitable corner structure, a plurality of layers 1 and 1' are provided with L-shaped notches 2 and 3 cut in the respective corners of each group of sheets. It will be noted that the L-shaped notches on the lower group of sheets extend in a different direction than the L-shaped notches on the upper group of sheets, so that, when the sheets are bent on the dotted line 4 and formed into an assembled structure, the overlapping flanges 5 on sheets 1 will be in staggered relation to the overlapping flanges 6 on the sheet 1'.

A plurality of sheets 1 and 1' may be formed as shown in Fig. 3 of the drawings. The preformed sheets 1' may then be placed over the preformed sheets 1. This operation may be performed by hand or, if desired, it may be accomplished by means of the preformer disclosed in Fig. 4 of the drawings. For example, a plurality of sheets, notched in the manner disclosed in Fig. 2, may be placed over the mold 7 and folded in a manner shown in Fig. 3. A plurality of sheets 1' are then placed over the folded sheet 1, and in turn, folded in the manner disclosed in Fig. 3. An appropriate tool 8 is then placed over the assembled sheets which preforms them into an assembled structure ready to be placed in the mold.

A cross-sectional view through the corner of the sheets, assembled and preformed in the manner specified, is shown in Fig. 5. It will be noted that the overlapping flanges 5 on the interior sheets are in staggered relation to the overlapping flanges 6 on the outer layers. The assembly of the sheets in such manner is particularly advantageous because it enables the formation of smooth interior and exterior surfaces and will ordinarily provide a corner having the requisite strength, although, if desired, additional reinforcing corners composed of paper, duck, or even wire mesh, may be interposed between some of the adjacent layers, as shown at 7' in Fig. 5 of the drawings.

Figure 2:
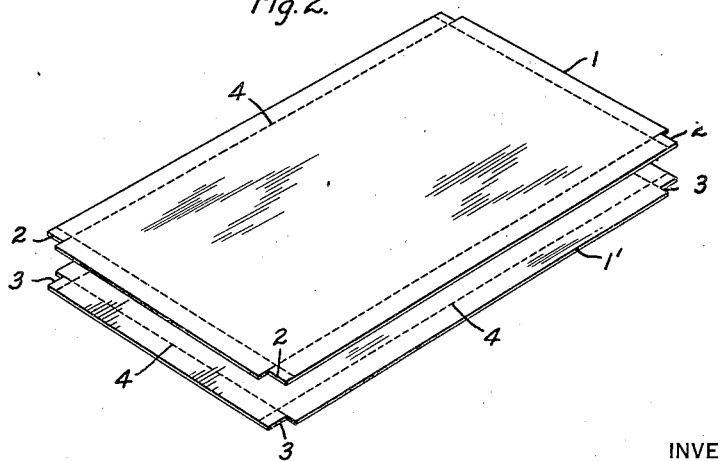
Fig. 2 is a perspective view showing how two groups of sheets may be folded to form the flanges on the table.

The method of notching and folding the blanks disclosed in Figs. 2, 3 and 5, is very satisfactory when paper, or paper interspersed with layers of duck, is employed as the fibrous sheet material, but, when heavier material, such as coarse fabric or duck is utilized exclusively, rectangular notches are preferably cut in the corners of sheets 1 and 1', as shown at 8 and 9 in Fig. 7. In folding the respective sheet on the dotted lines 4, the tongue 10 is folded at the corner, as shown at 12 in Fig. 6, and occupies the space formed by the notch 8. In the same manner, the tongue 11 is folded at the corner 12 and occupies the space formed by cutting out the notch 9. A plurality of sheets 1 and 1' are arranged in alternate layers, and the corners are formed, as shown in Fig. 6. This operation may be preformed by hand or the alternate sheets may be placed upon each other on the mold 7, the side flanges bent down on the dotted lines, the corners so arranged that they will fit into the respective notches provided for them and the tool 8 pressed down over the assembled layers to maintain them in preformed relationship.

The preformed sheets are next placed in a mold having a special construction, as shown in Figs. 8, 9, 10 and 11 of the drawings. The mold is composed of a base plate 13, having an upwardly extending rectangular flange 14. The outer margin of the matrix of the mold has a bevelled or rounded edge which constitutes a depression 15 for the purpose of providing a rolled edge on the article during the molding operation. After the preformed fibrous sheets have been placed in the mold, a plurality of wedge-shaped blocks comprising four corner blocks 15' and four side blocks 16, each of which is provided with a concave longitudinal projection 17, are placed in the mold, as shown in Fig. 10 of the drawings.

A central block 18, of inverted frusto-pyramidal shape, is then placed in the position shown in Fig. 8 of the drawings, and pressure is applied by means of a platen 19. The corner blocks 15' are provided with notches 20 to engage the corners of block 18. As the platen 19 descends, it first engages the block 18 and forces the side and corner blocks outwardly against the upwardly turned flanges 21 of the sheets.

As the platen 19 descends, it engages the side and corner blocks 15' and 16, and pressure is exerted upon the bottom of the fibrous material 22, and the projection 17 is forced into the depressions 15, forming the rolled margin 23. During the application of pressure, the fibrous material is heated in a manner well known in the art, thus causing the binder to flow, the pressure compacting the softened material. Upon continued application of heat and pressure, the entire mass solidifies to form a composite, integral structure.

The blocks are provided with screw holes 24 for receiving screws by means of which the blocks may be removed from the mold. The molded table top may be then removed and applied to a table, as shown in Fig. 1 of the drawings. During the application of pressure on the central block 18, and, subsequently, on the other blocks 15' and 16, a substantially uniform pressure is exerted against the entire inner structure of the fibrous material, whereby an article having a uniform cross-section is produced.

The binder employed in impregnating the fibrous material may be any of the well known binders that harden under heat and pressure, such as the well known phenolic condensation products or the various urea or thiourea resins. The upper and lower sheets employed in producing the table may be formed of paper upon which symbols resembling the grain of wood, have been printed or, if desired, the upper and lower sheets may be made of cloth, in which event, the surface of the table may be formed to embody any one of various designs.

A table top made in the manner specified is especially adapted for tables employed in hospitals because it may be maintained in a sanitary condition without difficulty and is resistant to heat, moisture, acids, and most alkalis. The material herein described may be placed on tables having tops composed of various materials, such as wood or metal, the downwardly extending flanges enabling it to be clamped securely in place, while the rolled edges prevent articles from rolling off. We do not desire, however, to limit our invention to covers for hospital tables, because, obviously, it has many applications, such as covers for kitchen tables or, because of its pleasing appearance, the material is especially suitable for utilization as covers for card tables.

While we have described our invention in considerable detail, and have given specific examples, it will be understood that the specific construction should be construed as illustrative and not by way of limitation, and, in view of the numerous modifications which may be effected therein without departing from the spirit and scope of our invention, it is desired that only such limitations shall be imposed as are indicated in the appended claims.

We claim as our invention:

1. A table cover formed of molded laminated material and having a continuous upper surface and downwardly extending flanges.

2. A table cover formed of molded laminated sheet material having a continuous upper surface rolled rim at its margin to prevent articles or liquid from being easily displaced from its surface.

3. A table cover formed of molded laminated sheet material impregnated with a heat-hardened binder, said cover having a continuous upper surface, a rolled rim at its margin for preventing articles from being displaced from its surface, and downwardly extending flanges to enable it to be clamped on a table.

4. A table cover formed of molded laminated sheets having smooth exterior and interior surfaces, a continuous upper surface, a rolled margin and downwardly extending flanges.

5. A table cover, formed of molded material impregnated with a heat hardened binder, having a continuous upper surface comprising a substantially flat central portion and a rolled rim, forming a peripheral upwardly extending border for said central portion and preventing articles deposited upon the flat portion from being displaced therefrom, said table cover also being provided with downwardly extending flanges to enable it to be applied to the table.

6. A table cover, formed of molded laminated sheet material impregnated with a heat hardened binder, having a continuous upper surface comprising a substantially flat central portion, an upwardly extending rolled rim surrounding said central portion for preventing articles from being displaced therefrom and downwardly extending flanges to enable the cover to be attached to a table.

7. A rectangular table cover, formed of molded laminated sheet material impregnated with a heat hardened binder having a continuous upper surface comprising a substantially flat central portion, an upwardly rolled rim surrounding said central portion for preventing articles being displaced therefrom and downwardly extending flanges to enable the cover to be applied to a table, the corners of said table being providing with reinforcing means.

8. The process of producing table covers which comprises cutting L-shaped notches in a plurality of sheets of fibrous material which have been impregnated with a binder capable of being hardened under heat and pressure, folding the sheets upwardly, thereby providing flanges, some of which have outwardly extending tongues, bending the tongues against adjacent flanges, thereby forming a smooth interior surface, preparing a plurality of additional sheets in the same manner with the exception that the outwardly extending tongues on the sheets are bent interiorly of the adjacent flange, assembling the additional sheets over those previously assembled, and molding the entire assembly under heat and pressure to form a table cover having a reinforced corner structure and smooth interior and exterior surfaces.

9. The process of producing table covers which comprises cutting notches in a plurality of rectangular sheets of fibrous material, impregnated with a binder capable of being hardened under heat and pressure, bending the margin of the sheets to form upwardly extending flanges, assembling a plurality of sheets in overlapping engagement with each other, inserting reinforcing means between some of the sheets at the corners, and molding the assembly under heat and pressure to form a composite structure.

10. The process of producing table covers which comprises cutting notches in a plurality of sheets of fibrous material impregnated with a binder capable of being hardened under heat and pressure, bending the sheets to form upwardly extending flanges, assembling a plurality of such sheets in engaging relation with each other, inserting reinforcing strips between some of the sheets at the corners so as to make engagement with two adjacent flanges, placing the assembly in a press having a matrix provided with a main flat bottom portion surrounded by a depressed portion and upwardly extending flanges and molding the assembly under heat and pressure so as to form a cover having a rolled rim and downwardly extending flanges.

In testimony whereof, we have hereunto subscribed our names this 8th day of May, 1930.

ERNEST H. OTT.
BENJAMIN J. GUDGE.